US012009134B2

(12) United States Patent
Hayamizu et al.

(10) Patent No.: US 12,009,134 B2
(45) Date of Patent: Jun. 11, 2024

(54) STATIONARY INDUCTION APPARATUS

(71) Applicant: Mitsubishi Electric Corporation, Tokyo (JP)

(72) Inventors: Shiki Hayamizu, Tokyo (JP); Yuichiro Ishida, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 505 days.

(21) Appl. No.: 17/429,081

(22) PCT Filed: Apr. 25, 2019

(86) PCT No.: PCT/JP2019/017608
§ 371 (c)(1),
(2) Date: Aug. 6, 2021

(87) PCT Pub. No.: WO2020/217376
PCT Pub. Date: Oct. 29, 2020

(65) Prior Publication Data

US 2022/0020520 A1 Jan. 20, 2022

(51) Int. Cl.

| | |
|---|---|
| ***H01F 27/12*** | (2006.01) |
| ***H01F 27/02*** | (2006.01) |
| ***H01F 27/30*** | (2006.01) |
| ***H01F 27/32*** | (2006.01) |

(52) U.S. Cl.
CPC ......... *H01F 27/125* (2013.01); *H01F 27/025* (2013.01); *H01F 27/306* (2013.01); *H01F 27/324* (2013.01)

(58) Field of Classification Search
CPC .... H01F 27/125; H01F 27/025; H01F 27/306; H01F 27/324; H01F 27/322; H01F 27/12; H01F 27/105; H01F 27/2876
See application file for complete search history.

(56) References Cited

FOREIGN PATENT DOCUMENTS

| | | | |
|---|---|---|---|
| JP | S4883365 A | 11/1973 | |
| JP | S5033616 Y1 | 10/1975 | |
| JP | S5426623 U | 2/1979 | |
| JP | S58196814 U | 12/1983 | |
| WO | 2011049040 A1 | 4/2011 | |
| WO | 2016009521 A1 | 1/2016 | |
| WO | WO-2016009521 A1 * | 1/2016 | ............. H01F 27/12 |

OTHER PUBLICATIONS

International Search Report (PCT/ISA/210) with translation and Written Opinion (PCT/ISA/237) mailed on Jun. 25, 2019, by the Japan Patent Office as the International Searching Authority for International Application No. PCT/JP2019/017608.

* cited by examiner

*Primary Examiner* — Shawki S Ismail
*Assistant Examiner* — Eric Waterstreet
(74) *Attorney, Agent, or Firm* — BUCHANAN INGERSOLL & ROONEY PC

(57) ABSTRACT

A first plate-like portion is provided with a plurality of first holes extending therethrough in a central axis direction. A second plate-like portion is provided with a plurality of second holes extending therethrough in the central axis direction. The plurality of first holes, the plurality of second holes, a first notch and a second notch overlap one another, to thereby form a flow path which connects one side and the other side of each of a plurality of insulating plates and through which insulating oil can flow in a first direction.

2 Claims, 17 Drawing Sheets

STATIONARY INDUCTION APPARATUS

TECHNICAL FIELD

The present invention relates to a stationary induction apparatus.

BACKGROUND ART

Japanese Utility Model Laying-Open No. 58-196814 (PTL 1) is a document that discloses a configuration of a stationary induction apparatus. In a transformer which is a stationary induction apparatus described in PTL 1, a high-voltage winding and a low-voltage winding are insulated from each other by a flat interwinding insulating plate. Between the high-voltage winding and the low-voltage winding, an oil duct is formed by affixing insulating pieces to a surface of the flat insulating plate. A tank contains these components, and is filled with insulating oil. The insulating oil enters between the high-voltage winding and the low-voltage winding via one ends of the windings, and is heated by receiving heat of these windings while passing between them. The insulating oil is delivered to the outside via the other ends of the windings, into an oil cooler by an oil pump through a pipe, and is then cooled by a blower and returns to the tank.

CITATION LIST

Patent Literature

PTL 1: Japanese Utility Model Laying-Open No. 58-196814

SUMMARY OF INVENTION

Technical Problem

Between a plurality of windings included in a conventional stationary induction apparatus, insulating oil may flow between a plurality of insulating pieces affixed to an insulating plate. In this case, the plurality of insulating pieces are arranged one by one in consideration of a flow path to be formed. This results in a complicated work of affixing the plurality of insulating pieces.

The present invention was made in view of the problem described above, and has an object to provide a stationary induction apparatus in which a flow path for insulating oil can be readily formed between a plurality of windings.

Solution to Problem

A stationary induction apparatus based on the present invention includes a core, a plurality of windings, a plurality of insulating plates, and a tank. Each of the plurality of windings is wound around the core, with the core as a central axis. Each of the plurality of windings is coaxially arranged. Each of the plurality of insulating plates is located so as to be sandwiched between every two adjacent windings of the plurality of windings. The tank contains the core, the plurality of windings and the plurality of insulating plates. The tank is filled with insulating oil. The tank is configured such that the insulating oil flows within the tank in a first direction orthogonal to a central axis direction of the plurality of windings. The plurality of insulating plates each include a first plate-like portion and a second plate-like portion adjacent to each other in the central axis direction. The first plate-like portion is provided with a plurality of first holes extending therethrough in the central axis direction. The second plate-like portion is provided with a plurality of second holes extending therethrough in the central axis direction. At least one of the first plate-like portion and the second plate-like portion is provided with a first notch at one edge in the first direction, and is provided with a second notch at the other edge in the first direction. The plurality of first holes, the plurality of second holes, the first notch and the second notch overlap one another, to thereby form a flow path which connects one side and the other side of each of the plurality of insulating plates and through which the insulating oil can flow in the first direction.

Advantageous Effects of Invention

According to the present invention, the flow path for insulating oil can be readily formed between the plurality of windings by disposing the first plate-like portion and the second plate-like portion to be adjacent to each other, without arranging a plurality of insulating pieces on the insulating plate.

DESCRIPTION OF EMBODIMENTS

Figure 1:
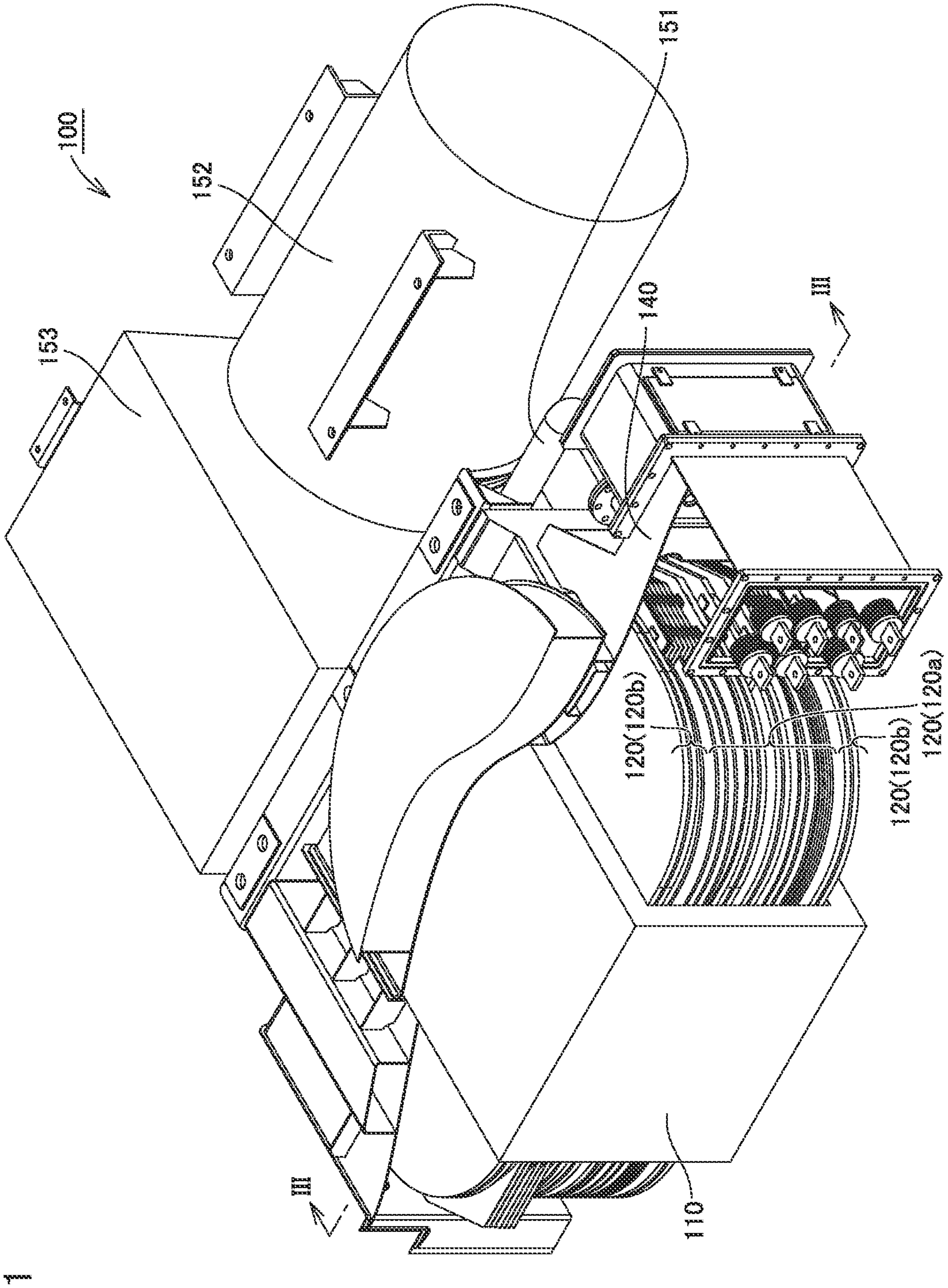
FIG. 1 is a perspective view showing an external appearance of a stationary induction apparatus according to a first embodiment of the present invention.

Stationary induction apparatuses according to embodiments of the present invention will be hereinafter described with reference to the drawings. In the following description of the embodiments, the same or corresponding parts in the drawings are designated by the same symbols and a description thereof will not be repeated.

First Embodiment

Figure 2:
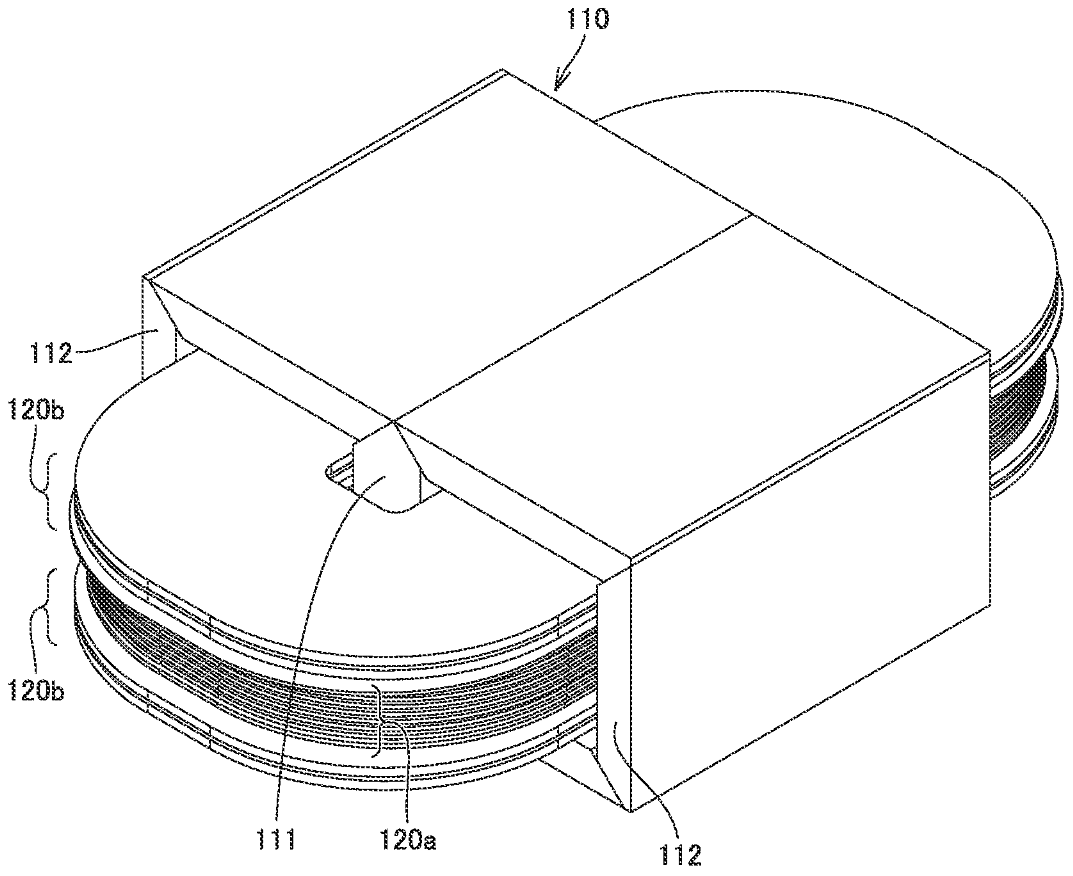
FIG. 2 is a perspective view showing part of a configuration of the stationary induction apparatus according to the first embodiment of the present invention.
Figure 3:
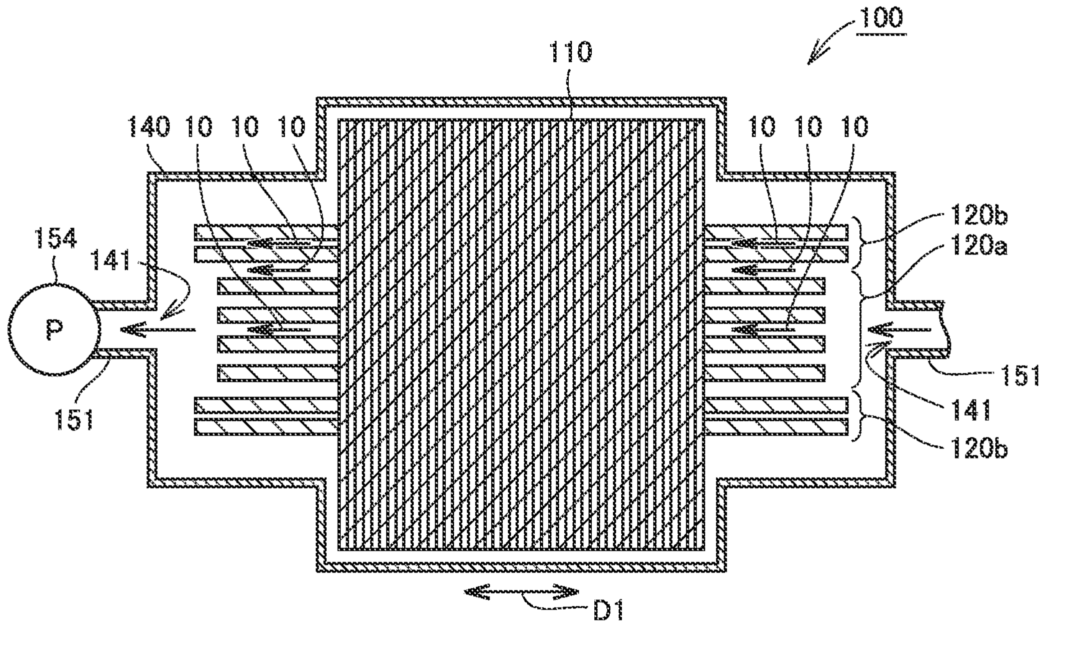
FIG. 3 is a partial cross-sectional view of the stationary induction apparatus shown in FIG. 1 when viewed in a direction of arrows of line III-III.
Figure 4:
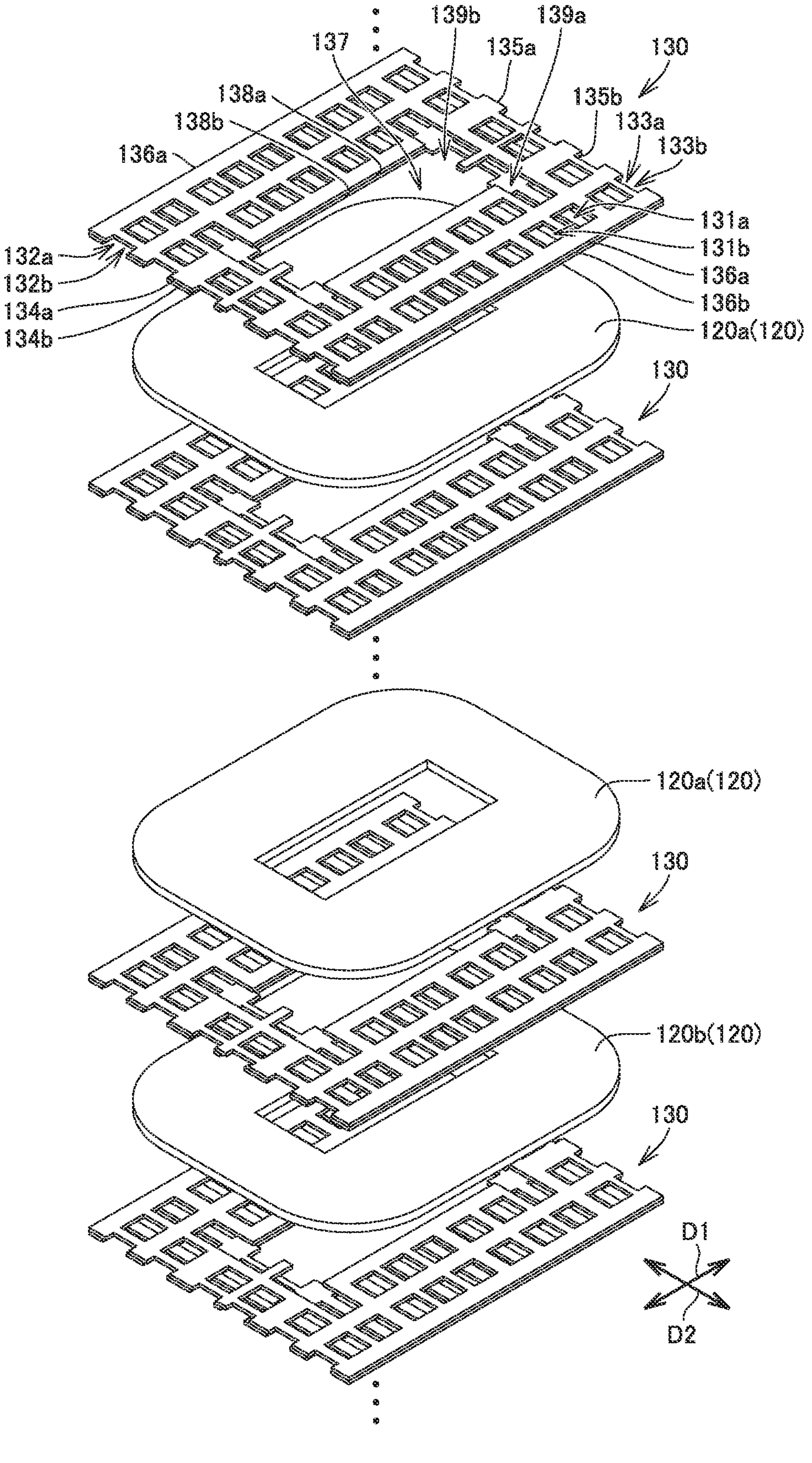
FIG. 4 is an exploded perspective view showing a multilayer structure of a plurality of windings and a plurality of insulating plates included in the stationary induction apparatus according to the first embodiment of the present invention.

FIG. 1 is a perspective view showing an external appearance of a stationary induction apparatus according to a first embodiment of the present invention. FIG. 2 is a perspective view showing part of a configuration of the stationary induction apparatus according to the first embodiment of the present invention. FIG. 3 is a partial cross-sectional view of the stationary induction apparatus shown in FIG. 1 when viewed in a direction of arrows of line III-III. FIG. 4 is an exploded perspective view showing a multilayer structure of a plurality of windings and a plurality of insulating plates included in the stationary induction apparatus according to the first embodiment of the present invention.

As shown in FIGS. 1 to 4, a stationary induction apparatus 100 according to the first embodiment of the present invention is an on-vehicle transformer. Stationary induction apparatus 100 according to the present embodiment is also a so-called shell-type transformer.

As shown in FIGS. 1 to 4, stationary induction apparatus 100 includes a core 110, a plurality of windings 120, a plurality of insulating plates 130, and a tank 140. The plurality of insulating plates 130 are not illustrated in FIGS. 2 and 3.

As shown in FIG. 2, core 110 includes a main leg 111 and side legs 112. Side legs 112 are connected to main leg 111.

As shown in FIGS. 1 and 2, each of the plurality of windings 120 is wound around core 110, with core 110 as a central axis. Specifically, each of the plurality of windings 120 is wound around main leg 111 while being passed between main leg 111 and side legs 112. In this manner, each of the plurality of windings 120 is coaxially arranged. Each of the plurality of windings 120 is a plate winding in the present embodiment.

As shown in FIGS. 1 to 3, the plurality of windings 120 include a plurality of high-voltage windings **120*a* and a plurality of low-voltage windings 120*b*. In a central axis direction of the plurality of windings 120, the plurality of high-voltage windings 120*a* are located so as to be sandwiched between a pair of the plurality of low-voltage windings 120*b***.

As shown in FIG. 4, each of the plurality of insulating plates 130 is located so as to be sandwiched between every two adjacent windings 120 of the plurality of windings 120. A configuration of each of the plurality of insulating plates 130 will be described later.

As shown in FIGS. 3 and 4, tank 140 contains core 110, the plurality of windings 120 and the plurality of insulating plates 130. Tank 140 is filled with insulating oil. Tank 140 is configured such that the insulating oil flows within tank 140 in a first direction D1 orthogonal to the central axis direction of the plurality of windings 120.

As shown in FIGS. 1 and 3, stationary induction apparatus 100 further includes a circulation pipe 151. Circulation pipe 151 connects two connection portions 141 located at opposite ends of tank 140 in first direction D1, respectively. Circulation pipe 151 is provided with a pump 154. Operation of this pump 154 causes the insulating oil to circulate through tank 140 and circulation pipe 151.

Circulation pipe 151 is further connected to a cooling container 153. Cooling container 153 is cooled from outside by air delivered from an electric blower 152. As a result, the insulating oil that has flowed into cooling container 153 is cooled, and then flows into circulation pipe 151 again.

The insulating oil that has flowed in via one of connection portions 141 flows through a flow path 10 for insulating oil that is formed between the plurality of windings 120 adjacent to each other. As a result, heat of windings 120 adjacent to flow path 10 is transferred to the insulating oil. The plurality of windings 120 are thereby cooled.

Flow path 10 is formed of the plurality of insulating plates 130. Flow path 10 in the present embodiment will be hereinafter described along with the configuration of the plurality of insulating plates 130.

Figure 5:
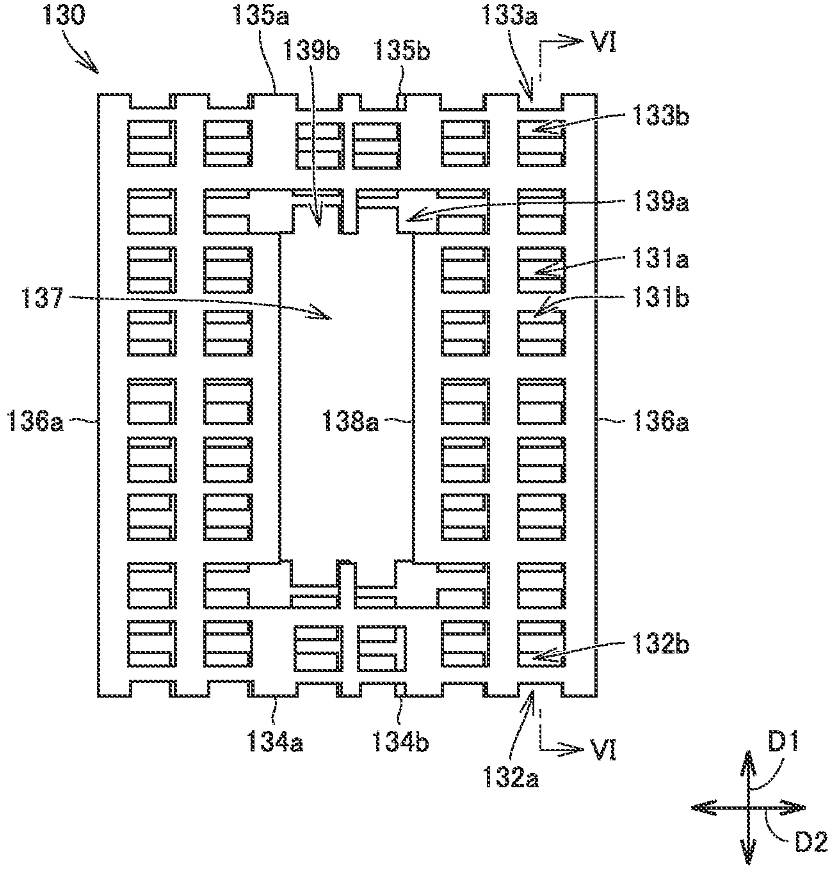
FIG. 5 is a diagram showing a shape of an insulating plate in the first embodiment of the present invention.
Figure 6:
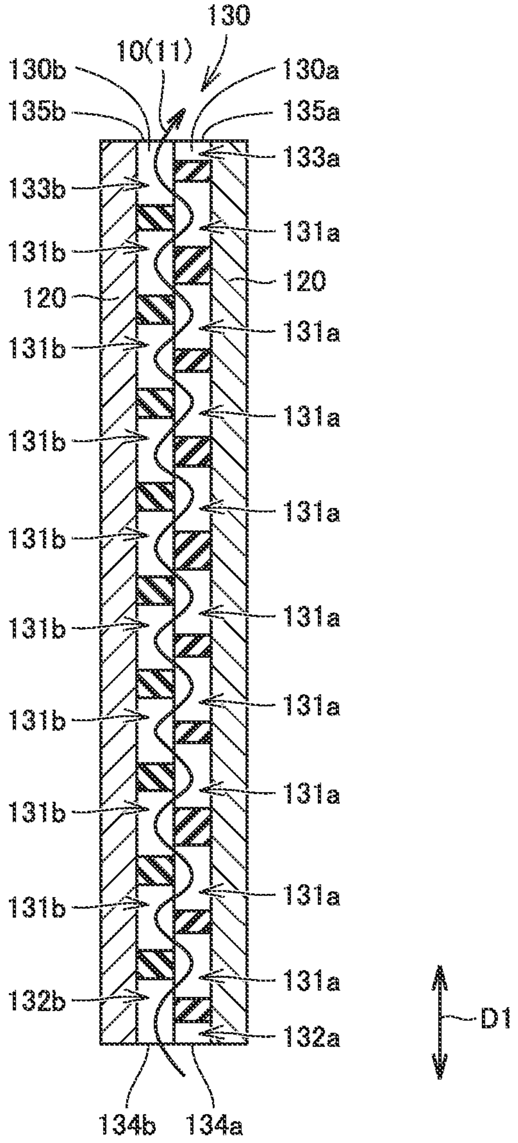
FIG. 6 is a cross-sectional view of the insulating plate shown in FIG. 5 when viewed in a direction of arrows of line VI-VI.
Figure 7:
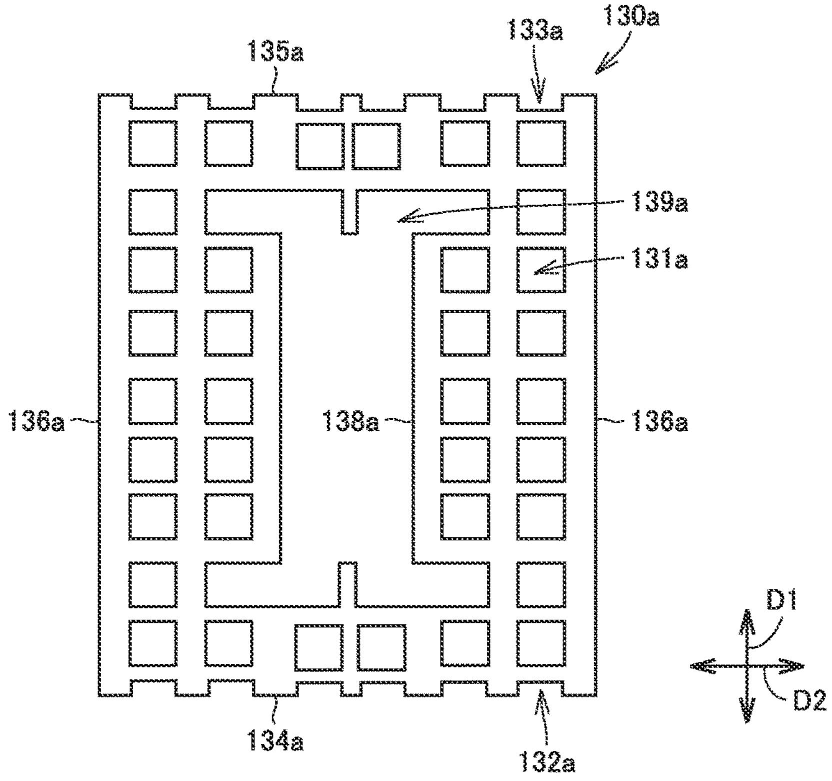
FIG. 7 is a diagram showing a shape of a first plate-like portion of the insulating plate in the first embodiment of the present invention.
Figure 8:
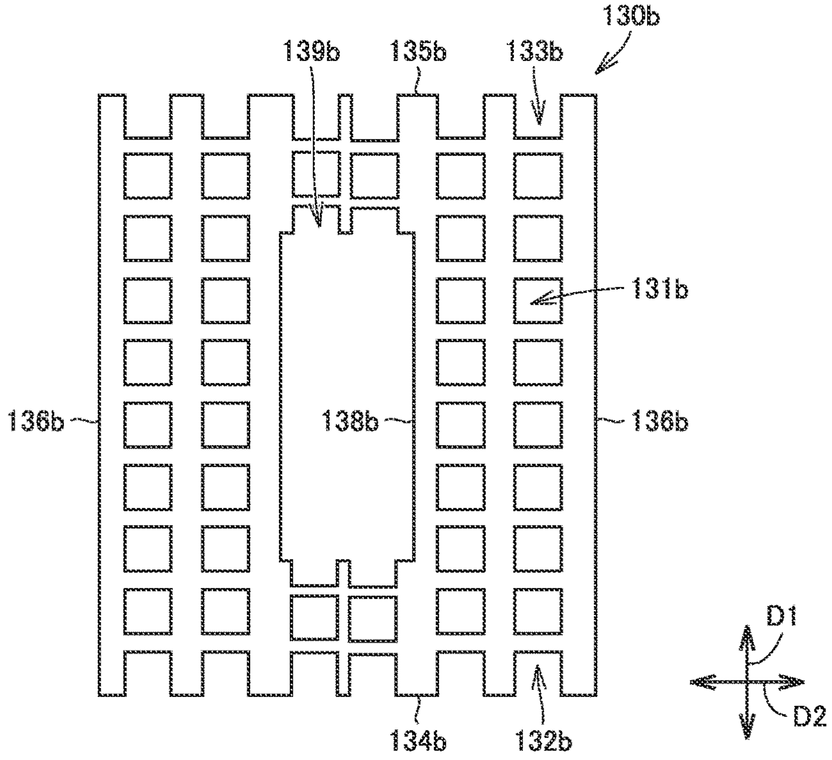
FIG. 8 is a diagram showing a shape of a second plate-like portion of the insulating plate in the first embodiment of the present invention.

FIG. 5 is a diagram showing a shape of an insulating plate in the first embodiment of the present invention. FIG. 6 is a cross-sectional view of the insulating plate shown in FIG. 5 when viewed in a direction of arrows of line VI-VI. FIG. 7 is a diagram showing a shape of a first plate-like portion of the insulating plate in the first embodiment of the present invention. FIG. 8 is a diagram showing a shape of a second plate-like portion of the insulating plate in the first embodiment of the present invention. The plurality of windings 120 adjacent to insulating plate 130 are also illustrated in FIG. 6.

As shown in FIGS. 4 and 5, each of the plurality of insulating plates 130 has a rectangular outer shape, when viewed in the central axis direction of the plurality of windings 120. Each of the plurality of insulating plates 130 is located such that a longitudinal direction of each of the plurality of insulating plates 130 is along first direction D1. That is, each of the plurality of insulating plates 130 is located such that a transverse direction of each of the plurality of insulating plates 130 is along a second direction D2 orthogonal to both the central axis direction and first direction D1.

Each of the plurality of insulating plates 130 is provided with an opening 137 extending therethrough in the central axis direction. Core 110 shown in FIG. 2 is located in opening 137. Specifically, main leg 111 is located in opening 137.

As shown in FIGS. 4 to 6, each of the plurality of insulating plates 130 includes a first plate-like portion **130*a* and a second plate-like portion 130*b* adjacent to each other in the central axis direction. In the present embodiment, each of the plurality of insulating plates 130 is formed of first plate-like portion 130***a* and second plate-like portion 130*b*. Each of first plate-like portion 130*a* and second plate-like portion 130*b* is made of an insulating material, for example, insulating paper such as pressboard, or an insulating material such as polyamide.

As shown in FIG. 7, first plate-like portion 130*a* is provided with a plurality of first holes 131*a* extending therethrough in the central axis direction. When viewed in the central axis direction, first hole 131*a* has a rectangular outer shape, specifically, a square outer shape.

In the present embodiment, first plate-like portion 130*a* is provided with a first notch 132*a* at one edge 134*a* in first direction D1. Specifically, first plate-like portion 130*a* is provided with a plurality of first notches 132*a*. In the present embodiment, each corner of each of the plurality of first notches 132*a* in first plate-like portion 130*a* forms a right angle.

First plate-like portion 130*a* is provided with a second notch 133*a* at the other edge 135*a* in first direction D1. Specifically, first plate-like portion 130*a* is provided with a plurality of second notches 133*a*. In the present embodiment, each corner of each of the plurality of second notches 133*a* in first plate-like portion 130*a* forms a right angle.

Side edges 136*a* located at opposite sides of first plate-like portion 130*a* in second direction D2 each have a linear outer shape along first direction D1.

First plate-like portion 130*a* is provided with a plurality of inner peripheral notches 139*a* at inner peripheral edges 138*a*. The plurality of inner peripheral notches 139*a* are located so as to be sandwiched between the plurality of first holes 131*a* in first direction D1.

The outer shapes of first hole 131*a*, and first notch 132*a* and second notch 133*a* in first plate-like portion 130*a* when viewed in the central axis direction are not particularly limited. The outer shapes of first hole 131*a*, and first notch 132*a* and second notch 133*a* in first plate-like portion 130*a* when viewed in the central axis direction can be varied as appropriate so as to reduce pressure loss caused by the shape of flow path 10 for insulating oil.

As shown in FIG. 8, second plate-like portion 130*b* is provided with a plurality of second holes 131*b* extending therethrough in the central axis direction. When viewed in the central axis direction, second hole 131*b* has a rectangular outer shape, specifically, a square outer shape.

In the present embodiment, second plate-like portion 130*b* is provided with a first notch 132*b* at one edge 134*b* in first direction D1. Specifically, second plate-like portion 130*b* is provided with a plurality of first notches 132*b*. In the present embodiment, each corner of each of the plurality of first notches 132*b* in second plate-like portion 130*b* forms a right angle.

Second plate-like portion 130*b* is provided with a second notch 133*b* at the other edge 135*b* in first direction D1. Specifically, second plate-like portion 130*b* is provided with a plurality of second notches 133*b*. In the present embodiment, each corner of each of the plurality of second notches 133*b* in second plate-like portion 130*b* forms a right angle.

Side edges 136*b* located at opposite sides of second plate-like portion 130*b* in second direction D2 each have a linear outer shape along first direction D1. Second plate-like portion 130*b* is provided with a plurality of inner peripheral notches 139*b* at inner peripheral edges 138*b*.

The outer shapes of second hole 131*b*, and first notch 132*b* and second notch 133*b* in second plate-like portion 130*b* when viewed in the central axis direction are not particularly limited. The outer shapes of second hole 131*b*, and first notch 132*b* and second notch 133*b* in second plate-like portion 130*b* when viewed in the central axis direction can be varied as appropriate so as to reduce pressure loss caused by the shape of flow path 10 for insulating oil.

As described above, at least one of first plate-like portion 130*a* and second plate-like portion 130*b* is provided with first notch 132*a*, 132*b* at one edge 134*a*, 134*b* in first direction D1, and is provided with second notch 133*a*, 133*b* at the other edge 135*a*, 135*b* in first direction D1.

As shown in FIGS. 5 and 6, the plurality of first holes 131*a*, the plurality of second holes 131*b*, first notches 132*a*, 132*b*, and second notches 133*a*, 133*b* overlap one another, to thereby form flow path 10 which connects one side and the other side of each of the plurality of insulating plates 130 and through which the insulating oil can flow in first direction D1.

As shown in FIGS. 5 and 6, when viewed in the central axis direction, flow path 10 includes a linear flow path 11 formed along first direction D1. In the present embodiment, when viewed in the central axis direction, flow path 10 includes a plurality of linear flow paths 11.

In the present embodiment, as shown in FIG. 6, for example, first hole 131*a* located closest to one edge 134*a* overlaps first notch 132*b*. Each of the plurality of second holes 131*b* overlaps both of two first holes 131*a* adjacent to each other in first direction D1. First hole 131*a* located closest to 135*a* overlaps second notch 133*b*. Linear flow path 11 is configured in this manner.

As shown in FIGS. 5 and 7, each of the plurality of inner peripheral notches 139*a* may be located between two of the plurality of first holes 131*a* aligned along first direction D1. In this case, linear flow path 11 is such that the plurality of first holes 131*a*, the plurality of second holes 131*b*, first notches 132*a*, 132*b*, second notches 133*a*, 133*b*, and the plurality of 139*a* overlap one another, to thereby form flow path 10 in first direction D1.

As described above, in stationary induction apparatus 100 according to the first embodiment of the present invention, the plurality of first holes 131*a*, the plurality of second holes 131*b*, first notches 132*a*, 132*b* and second notches 133*a*, 133*b* overlap one another, to thereby form flow path 10 which connects one side and the other side of each of the plurality of insulating plates 130 and through which the insulating oil can flow in first direction D1. As a result, flow path 10 for insulating oil can be readily formed between the plurality of windings 120 adjacent to each other, by disposing first plate-like portion 130*a* and second plate-like portion 130*b* to be adjacent to each other, without arranging a plurality of insulating pieces on the surface of each of the plurality of insulating plates 130.

In the first embodiment of the present invention, when viewed in the central axis direction, flow path 10 includes linear flow path 11 formed along first direction D1. As a result, in first direction D1, the insulating oil flowing through linear flow path 11 is capable of alternately cooling winding 120 adjacent to first plate-like portion 130*a* and winding 120 adjacent to second plate-like portion 130*b*. The plurality of windings 120 can, in turn, be efficiently cooled as a whole.

Second Embodiment

A stationary induction apparatus according to a second embodiment of the present invention will be hereinafter described. The stationary induction apparatus according to the second embodiment of the present invention is different only in the configuration of each of the plurality of insulating plates from stationary induction apparatus 100 according to the first embodiment of the present invention. Thus, a description of the configuration similar to that of stationary induction apparatus 100 according to the first embodiment of the present invention will not be repeated.

Figure 9:
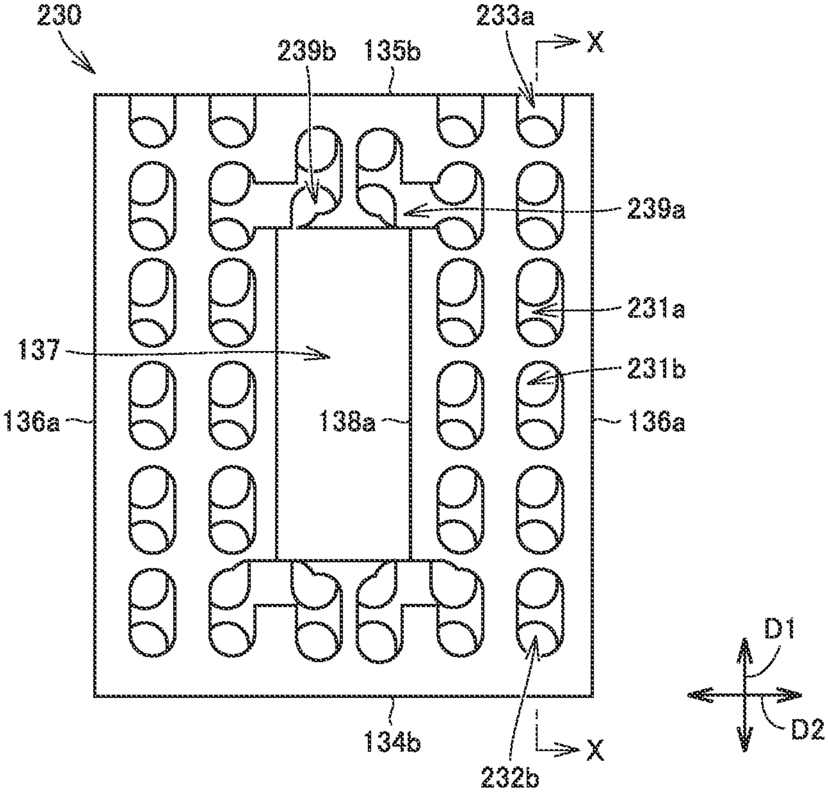
FIG. 9 is a diagram showing a shape of an insulating plate in a second embodiment of the present invention.
Figure 10:
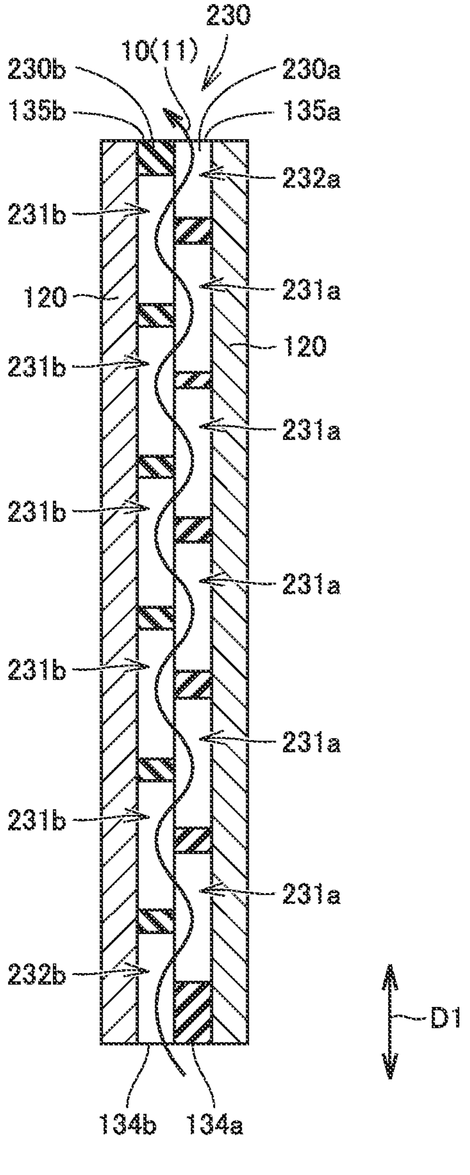
FIG. 10 is a cross-sectional view of the insulating plate shown in FIG. 9 when viewed in a direction of arrows of line X-X.
Figure 11:
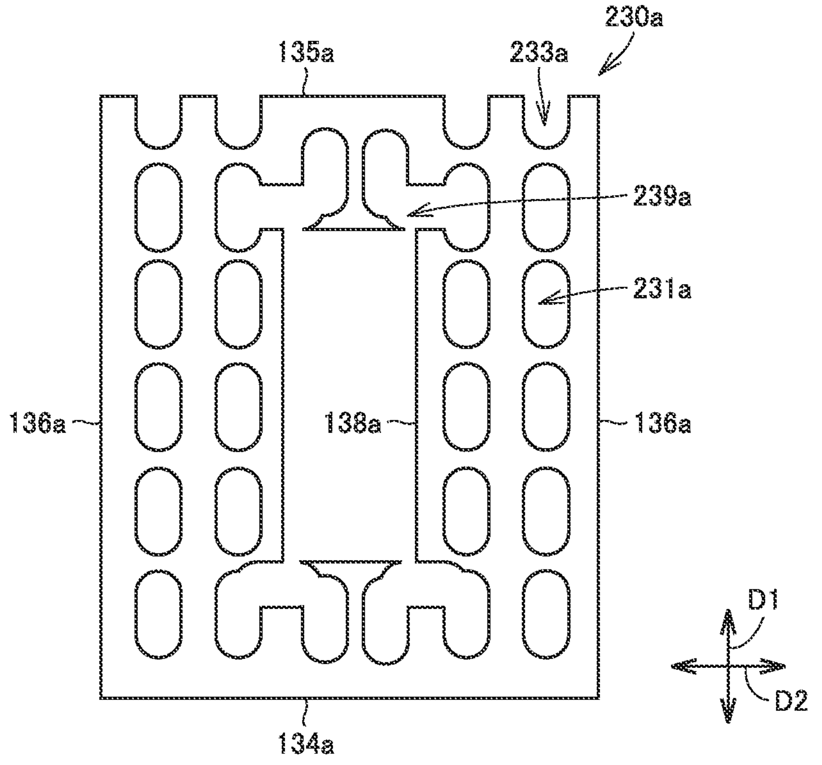
FIG. 11 is a diagram showing a shape of a first plate-like portion of the insulating plate in the second embodiment of the present invention.
Figure 12:
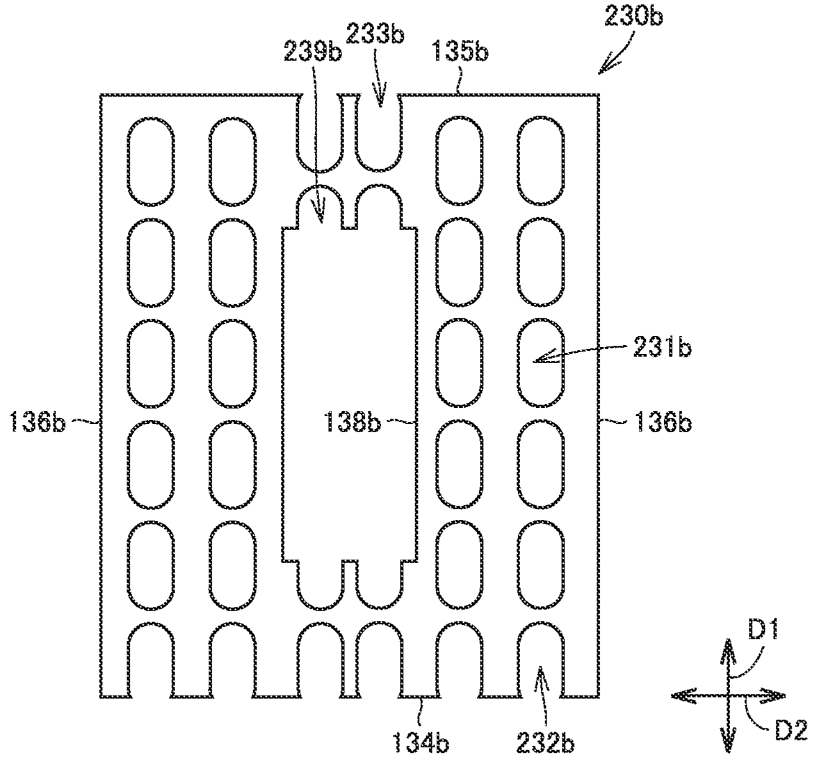
FIG. 12 is a diagram showing a shape of a second plate-like portion of the insulating plate in the second embodiment of the present invention.

FIG. 9 is a diagram showing a shape of an insulating plate in the second embodiment of the present invention. FIG. 10 is a cross-sectional view of the insulating plate shown in FIG. 9 when viewed in a direction of arrows of line X-X. FIG. 11 is a diagram showing a shape of a first plate-like portion of the insulating plate in the second embodiment of the present invention. FIG. 12 is a diagram showing a shape of a second plate-like portion of the insulating plate in the second embodiment of the present invention.

As shown in FIGS. 9 to 12, in a plurality of insulating plates 230 in the second embodiment of the present invention, each of a plurality of first holes 231*a* in a first plate-like portion 230*a* and second holes 231*b* in a second plate-like portion 230*b* includes rounded corners when viewed in the central axis direction. As a result, pressure loss in flow path 10 when the insulating oil flows through flow path 10 can be reduced.

In the present embodiment, each of a plurality of first notches 232*b*, a plurality of second notches 233*a*, 233*b*, and a plurality of inner peripheral notches 239*a*, 239*b* also includes rounded corners when viewed in the central axis direction.

Third Embodiment

A stationary induction apparatus according to a third embodiment of the present invention will be hereinafter described. The stationary induction apparatus according to the third embodiment of the present invention is mainly different in the position of each of the plurality of first holes and the plurality of second holes from stationary induction apparatus 100 according to the first embodiment of the present invention. Thus, a description of the configuration similar to that of stationary induction apparatus 100 according to the first embodiment of the present invention will not be repeated.

Figure 13:
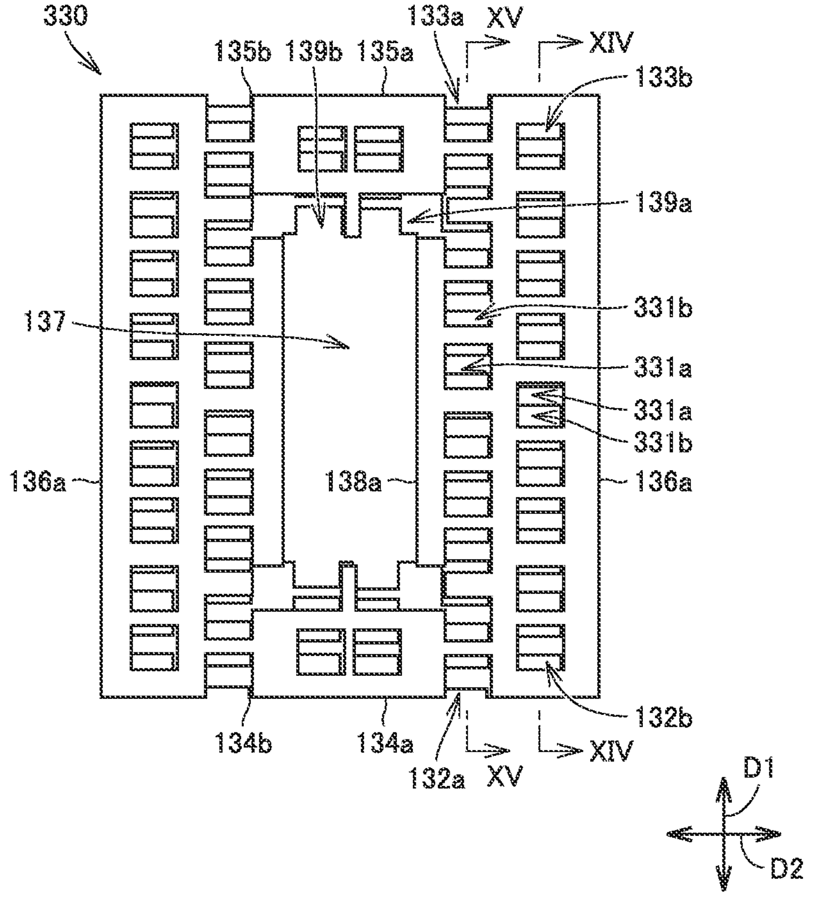
FIG. 13 is a diagram showing a shape of an insulating plate in a third embodiment of the present invention.
Figure 14:
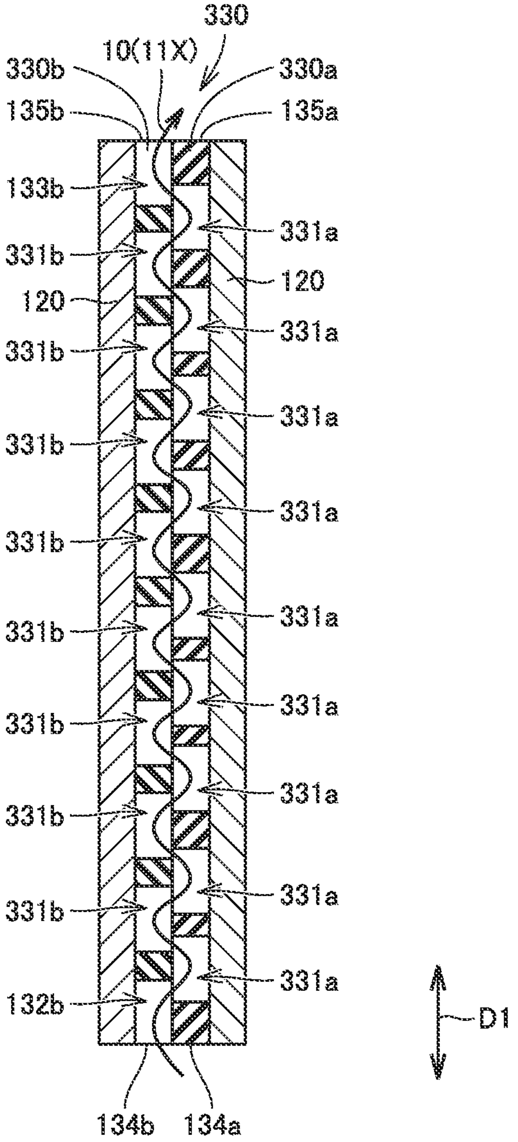
FIG. 14 is a diagram of the insulating plate shown in FIG. 13 when viewed in a direction of arrows of line XIV-XIV.
Figure 15:
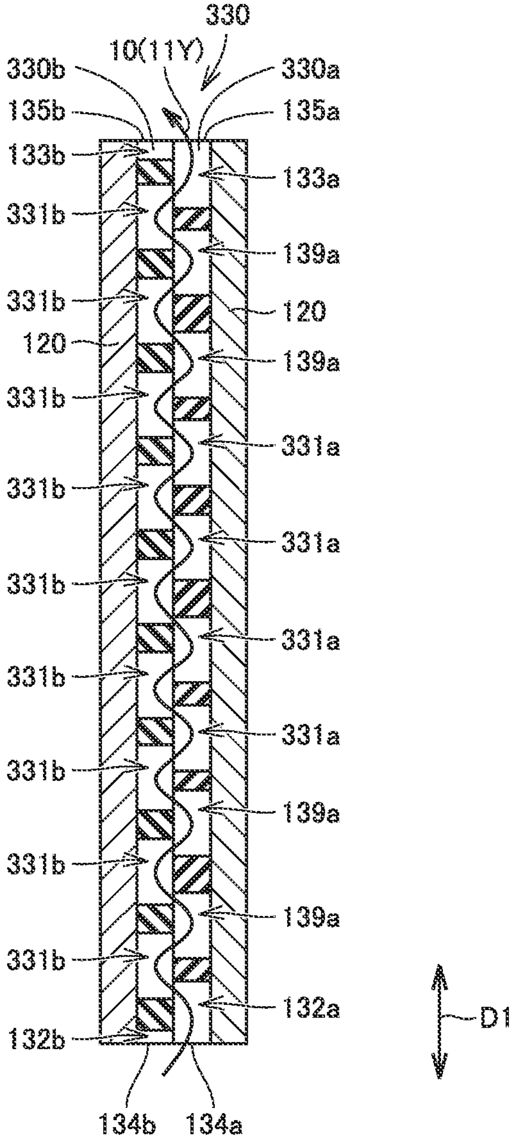
FIG. 15 is a diagram of the insulating plate shown in FIG. 13 when viewed in a direction of arrows of line XV-XV.
Figure 16:
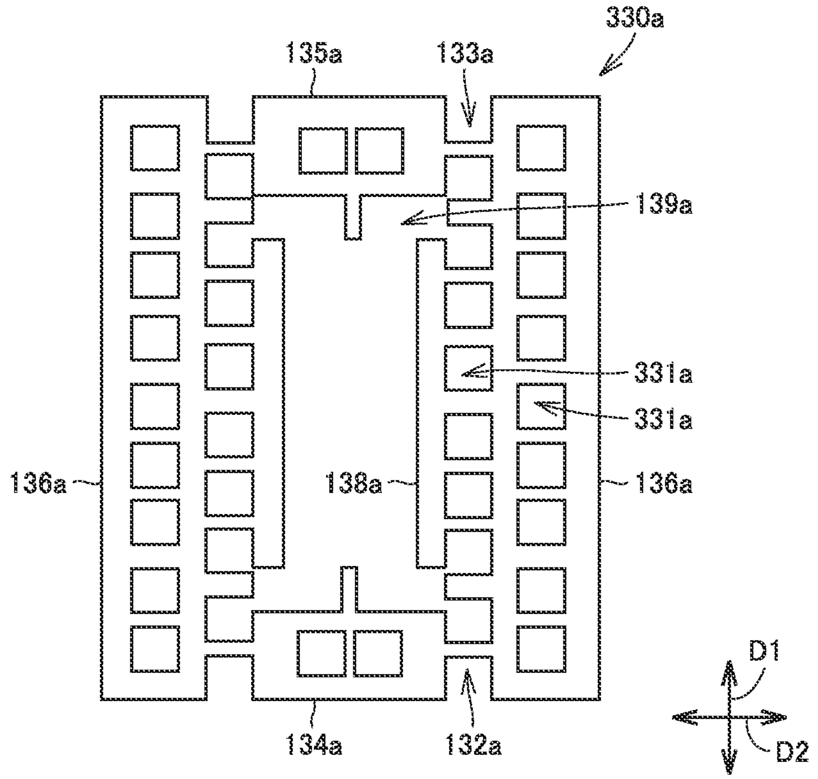
FIG. 16 is a diagram showing a shape of a first plate-like portion of the insulating plate in the third embodiment of the present invention.
Figure 17:
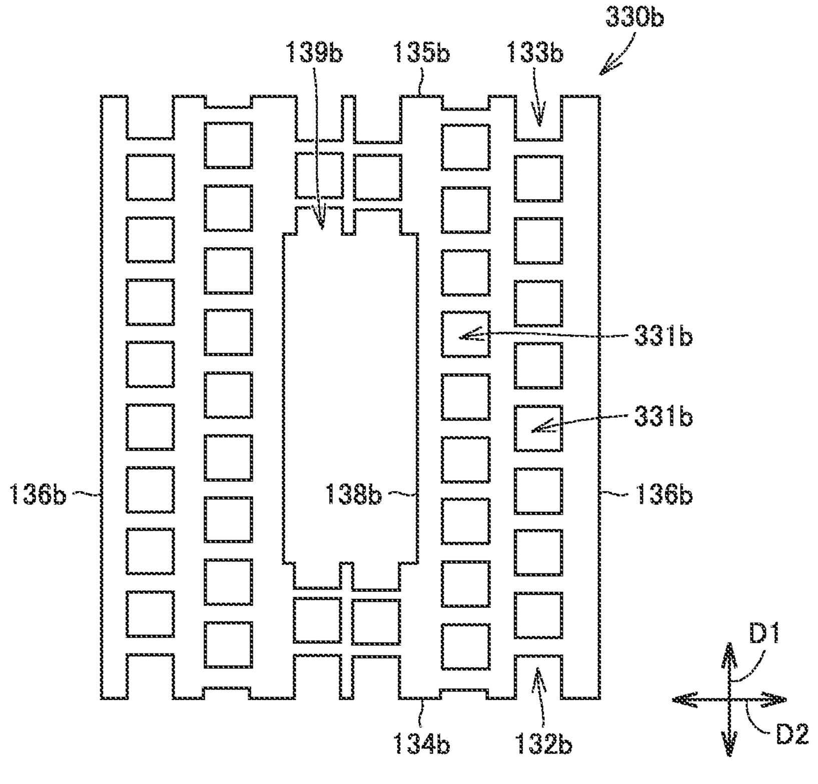
FIG. 17 is a diagram showing a shape of a second plate-like portion of the insulating plate in the third embodiment of the present invention.

FIG. 13 is a diagram showing a shape of an insulating plate in the third embodiment of the present invention. FIG. 14 is a diagram of the insulating plate shown in FIG. 13 when viewed in a direction of arrows of line XIV-XIV. FIG. 15 is a diagram of the insulating plate shown in FIG. 13 when viewed in a direction of arrows of line XV-XV. FIG. 16 is a diagram showing a shape of a first plate-like portion of the insulating plate in the third embodiment of the present invention. FIG. 17 is a diagram showing a shape of a second plate-like portion of the insulating plate in the third embodiment of the present invention.

In a plurality of insulating plates 330 in the third embodiment of the present invention, as shown in FIGS. 13 and 14, each of a plurality of first holes 331*a* in a first plate-like portion 330*a* forms part of one linear flow path 11X of a plurality of linear flow paths adjacent to each other. As shown in FIGS. 13 and 15, each of the plurality of first holes 331*a* forms part of the other linear flow path 11Y of the plurality of linear flow paths adjacent to each other. The plurality of first holes 331*a* forming one linear flow path 11X and the plurality of first holes 331*a* forming the other linear flow path 11Y are located in a staggered relation to each other in first direction D1, as shown in FIGS. 13 and 16. As shown in FIGS. 13 and 14, each of a plurality of second holes 331*b* in a second plate-like portion 330*b* forms part of one linear flow path 11X of a plurality of linear flow paths 11 adjacent to each other. As shown in FIGS. 13 and 15, each of the plurality of second holes 331*b* forms part of the other linear flow path 11Y of the plurality of linear flow paths adjacent to each other. The plurality of second holes 331*b* forming one linear flow path 11X and the plurality of second holes 331*b* forming the other linear flow path 11Y are located in a staggered relation to each other in first direction D1, as shown in FIGS. 13 and 17.

With the configuration described above, as shown in FIGS. 14 and 15, when viewed in second direction D2, a portion of the plurality of windings 120 that is not adjacent to one linear flow path 11X is adjacent to the other linear flow path 11Y. When viewed in second direction D2, a portion of the plurality of windings 120 that is not adjacent to the other linear flow path 11Y is adjacent to one linear flow path 11X. As a result, each of the plurality of windings 120 adjacent to each of the plurality of insulating plates 330 can be uniformly cooled.

Fourth Embodiment

A stationary induction apparatus according to a fourth embodiment of the present invention will be hereinafter described. The stationary induction apparatus according to the fourth embodiment of the present invention is mainly different in the position of each of the plurality of first holes and the plurality of second holes from stationary induction apparatus 100 according to the first embodiment of the present invention. Thus, a description of the configuration similar to that of stationary induction apparatus 100 according to the first embodiment of the present invention will not be repeated.

Figure 18:
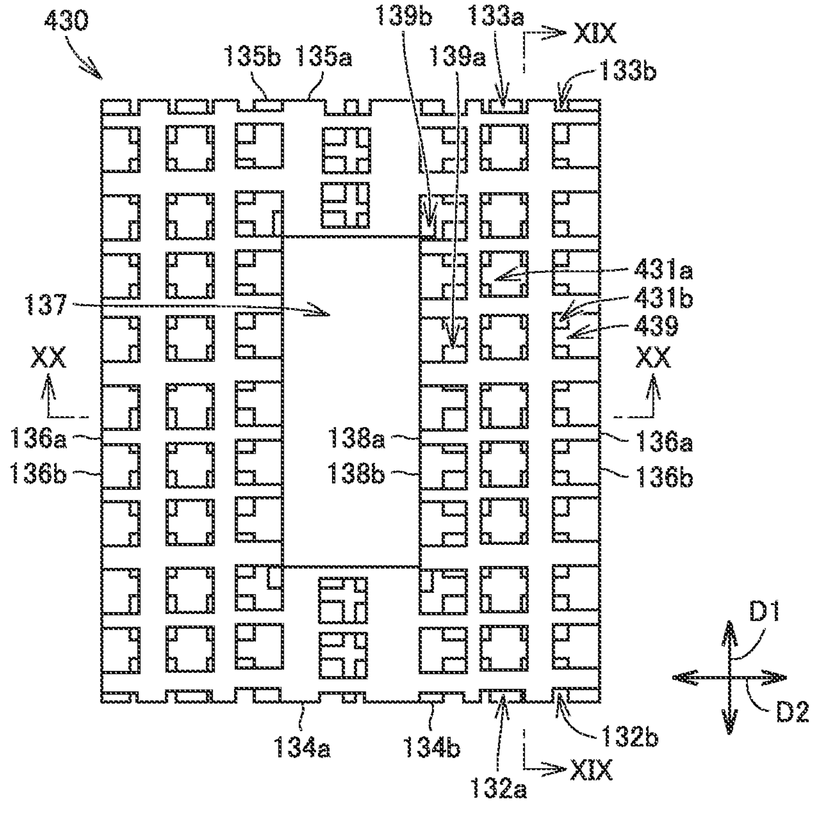
FIG. 18 is a diagram showing a shape of an insulating plate in a fourth embodiment of the present invention.
Figure 19:
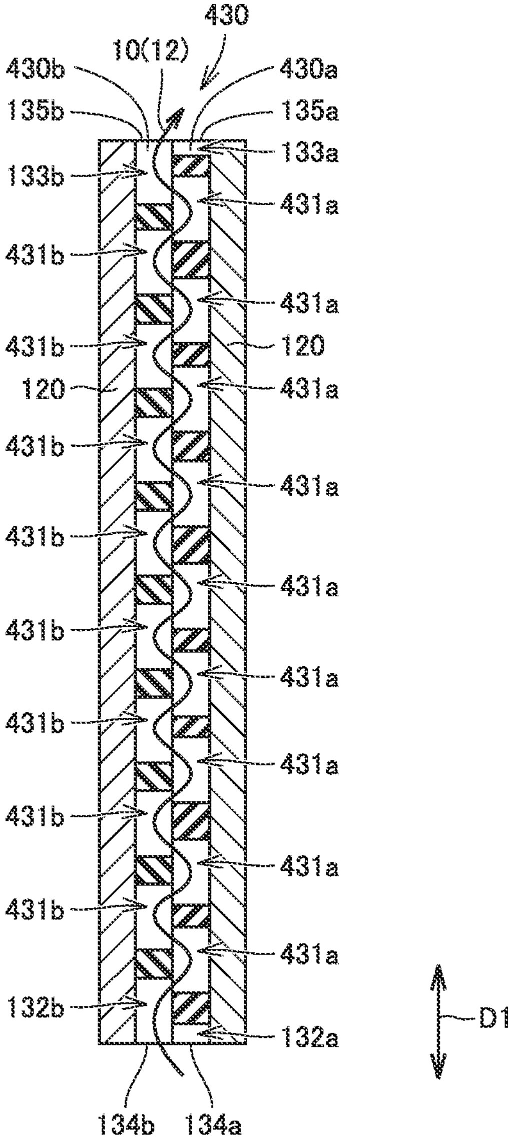
FIG. 19 is a diagram of the insulating plate shown in FIG. 18 when viewed in a direction of arrows of line XIX-XIX.
Figure 20:
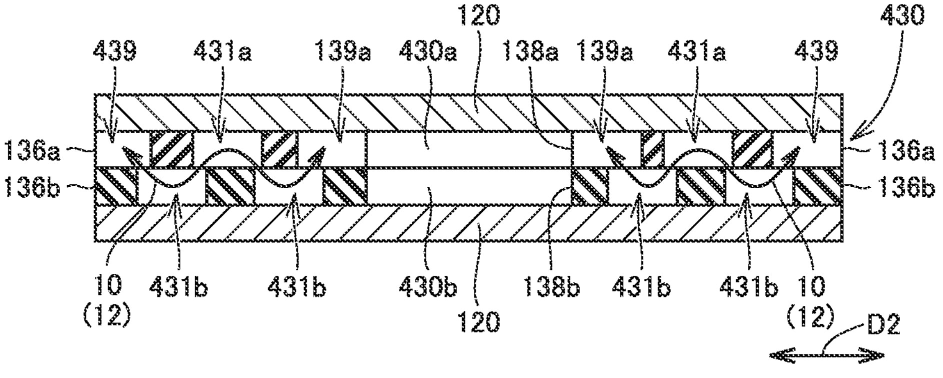
FIG. 20 is a diagram of the insulating plate shown in FIG. 18 when viewed in a direction of arrows of line XX-XX.
Figure 21:
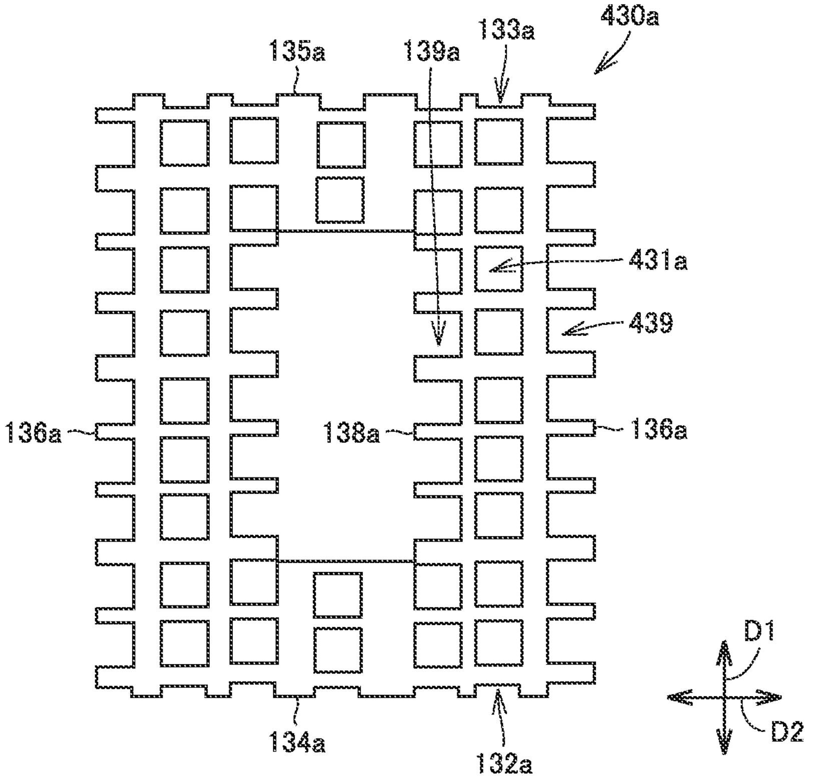
FIG. 21 is a diagram showing a shape of a first plate-like portion of the insulating plate in the fourth embodiment of the present invention.
Figure 22:
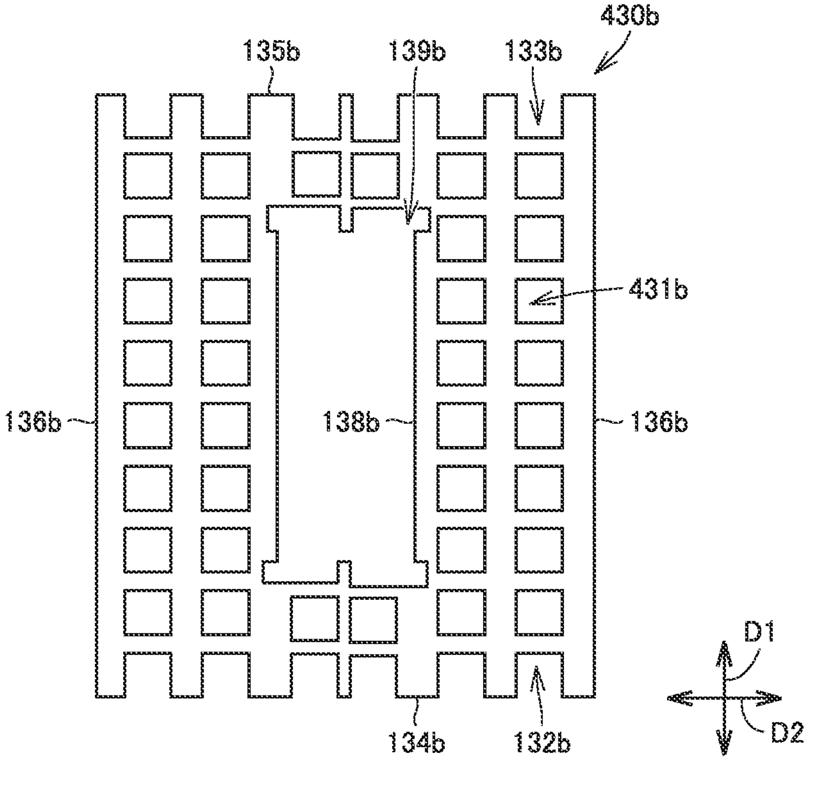
FIG. 22 is a diagram showing a shape of a second plate-like portion of the insulating plate in the fourth embodiment of the present invention.

FIG. 18 is a diagram showing a shape of an insulating plate in the fourth embodiment of the present invention. FIG. 19 is a diagram of the insulating plate shown in FIG. 18 when viewed in a direction of arrows of line XIX-XIX. FIG. 20 is a diagram of the insulating plate shown in FIG. 18 when viewed in a direction of arrows of line XX-XX. FIG. 21 is a diagram showing a shape of a first plate-like portion of the insulating plate in the fourth embodiment of the present invention. FIG. 22 is a diagram showing a shape of a second plate-like portion of the insulating plate in the fourth embodiment of the present invention.

As shown in FIGS. 18 and 19, also in the present embodiment, a first plate-like portion 430*a* and a second plate-like portion 430*b* form the plurality of flow paths 10 each of which connects one side and the other side of each of a plurality of insulating plates 430 and through each of which the insulating oil can flow in first direction D1.

Further, in the present embodiment, as shown in FIGS. 18 and 20, flow path 10 through which the insulating oil can flow is formed from side edges 136*a*, 136*b* to inner peripheral edges 138*a*, 138*b* in second direction D2. As shown in FIG. 20, flow path 10 along second direction D2 is formed, for example, by an overlap of a plurality of first holes 431*a*, a plurality of second holes 431*b*, inner peripheral notches 139*a*, and side notches 439 formed at side edges 136*a*.

As shown in FIGS. 18 to 20, each of the plurality of flow paths 10 along first direction D1 when viewed in the central axis direction and each of the plurality of flow paths 10 along second direction D2 when viewed in the central axis direction are connected to each other. In this manner, in the fourth embodiment of the present invention, flow path 10 includes a mesh-like flow path 12 when viewed in the central axis direction.

In the fourth embodiment of the present invention, as shown in FIGS. 18, 21 and 22, each of the plurality of first holes 431*a* and the plurality of second holes 431*b* is configured such that, when viewed in the central axis direction, a central portion of each of the plurality of first holes 431*a* and a central portion of each of the plurality of second holes 431*b* are located in a zigzag relation to each other.

In the stationary induction apparatus according to the fourth embodiment of the present invention, as the plurality of first holes 431*a* and the plurality of second holes 431*b* are arranged as described above, flow path 10 includes mesh-like flow path 12 when viewed in the central axis direction. The insulating oil can flow while taking various paths within mesh-like flow path 12, thereby more uniformly cooling the plurality of windings 120 in contact with each of the plurality of insulating plates 430.

Fifth Embodiment

A stationary induction apparatus according to a fifth embodiment of the present invention will be hereinafter described. The stationary induction apparatus according to the fifth embodiment of the present invention is mainly different in the number of plate-like portions forming the insulating plate from the stationary induction apparatus according to the fourth embodiment of the present invention. Thus, a description of the configuration similar to that of the stationary induction apparatus according to the fourth embodiment of the present invention will not be repeated.

Figure 23:
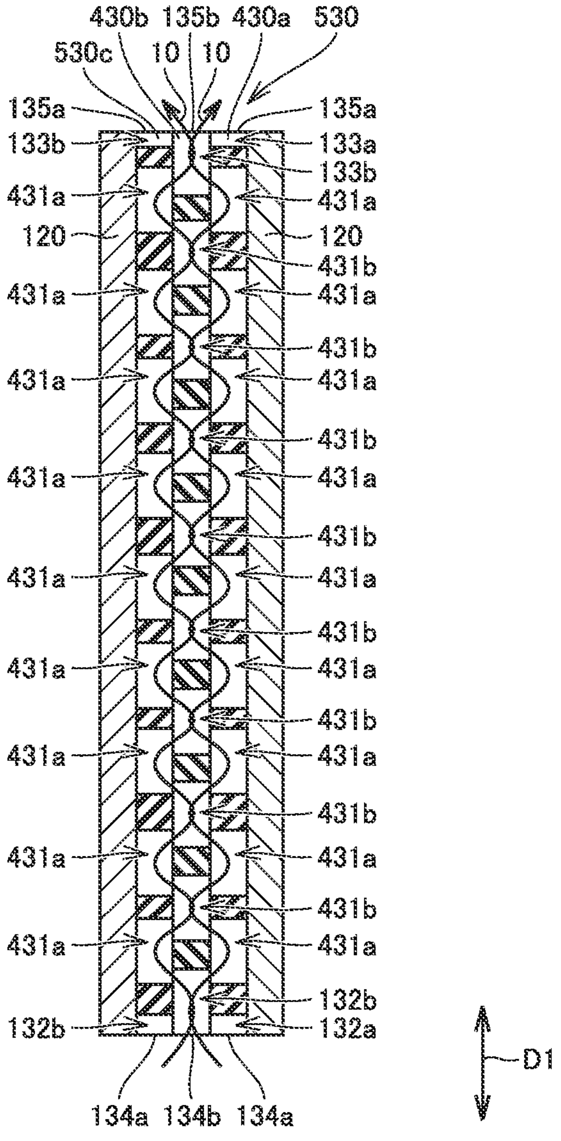
FIG. 23 is a cross-sectional view showing a configuration of an insulating plate in a fifth embodiment of the present invention.

FIG. 23 is a cross-sectional view showing a configuration of an insulating plate in the fifth embodiment of the present invention. In FIG. 23, insulating plate 430 in the fourth embodiment of the present invention is shown in the same cross section as in FIG. 19.

As shown in FIG. 23, in the fifth embodiment of the present invention, a plurality of insulating plates 530 each further include a third plate-like portion 530*c* located on the opposite side to first plate-like portion 430*a* in the central axis direction and adjacent to second plate-like portion 430*b*. In the present embodiment, the plurality of insulating plates 530 are each formed of first plate-like portion 430*a*, second plate-like portion 430*b* and third plate-like portion 530*c*.

Third plate-like portion 530*c* is identical in shape to first plate-like portion 430*a*, and is located symmetrically to first plate-like portion 430*a* with respect to second plate-like portion 430*b*. As a result, in each of two windings 120 adjacent to each of the plurality of insulating plates 530, two flow paths 10 in contact with windings 120 are identical in configuration. As a result, each of the plurality of windings 120 can be similarly cooled.

In the description of the foregoing embodiments, configurations that can be combined with each other may be combined together.

It is noted that the embodiments disclosed herein are illustrative in every respect, and do not serve as a basis for restrictive interpretation. Therefore, the technical scope of the present invention should not be interpreted based on the foregoing embodiments only, but is defined by the terms of the claims. Further, any modifications within the meaning and scope equivalent to the terms of the claims are encompassed.

REFERENCE SIGNS LIST

10 flow path; 11, 11X, 11Y linear flow path; 12 mesh-like flow path; 100 stationary induction apparatus; 110 core; 111 main leg; 112 side leg; 120 winding; 120*a* high-voltage winding; 120*b* low-voltage winding; 130, 230, 330, 430, 530 insulating plate; 130*a*, 230*a*, 330*a*, 430*a* first plate-like portion; 130*b*, 230*b*, 330*b*, 430*b* second plate-like portion; 131*a*, 231*a*, 331*a*, 431*a* first hole; 131*b*, 231*b*, 331*b*, 431*b* second hole; 132*a*, 132*b*, 232*b* first notch; 133*a*, 133*b*, 233*a*, 233*b* second notch; 134*a*, 134*b* one edge; 135*a*, 135*b* other edge; 136*a*, 136*b* side edge; 137 opening; 138*a*, 138*b* inner peripheral edge; 139*a*, 139*b*, 239*a*, 239*b* inner peripheral notch; 140 tank; 141 connection portion; 151 circulation pipe; 152 electric blower; 153 cooling container; 154 pump; 439 side notch; 530*c* third plate-like portion; D1 first direction; D2 second direction.

The invention claimed is:

1. A stationary induction apparatus comprising:

a core;

a plurality of windings wound around the core, with the core as a central axis, and coaxially arranged;

a plurality of insulating plates, each being located so as to be sandwiched between every two adjacent windings of the plurality of windings; and a tank to contain the core, the plurality of windings and the plurality of insulating plates, the tank being filled with insulating oil, the tank being configured such that the insulating oil flows within the tank in a first direction orthogonal to a central axis direction of the plurality of windings, the plurality of insulating plates each including a first plate-like portion and a second plate-like portion adjacent to each other in the central axis direction, the first plate-like portion being provided with a plurality of first holes extending therethrough in the central axis direction, the second plate-like portion being provided with a plurality of second holes extending therethrough in the central axis direction, at least one of the first plate-like portion and the second plate-like portion being provided with a first notch at one edge in the first direction, and being provided with a second notch at the other edge in the first direction, and the plurality of first holes, the plurality of second holes, the first notch and the second notch overlapping one another, to thereby form a flow path which connects one side and the other side of each of the plurality of insulating plates and through which the insulating oil can flow in the first direction, wherein when viewed in the central axis direction, the flow path includes a linear flow path formed along the first direction, when viewed in the central axis direction, the flow path includes a plurality of the linear flow paths, the plurality of first holes forming one of the plurality of the linear flow paths adjacent to each other and the plurality of first holes forming the other linear flow path are located in a staggered relation to each other in the first direction, and the plurality of second holes forming one of the plurality of the linear flow paths adjacent to each other and the plurality of second holes forming the other linear flaw path are located in a staggered relation to each other in the first direction.

2. A stationary induction apparatus, comprising:

a core;

a plurality of windings wound around the core, with the core as a central axis, and coaxially arranged;

a plurality of insulating plates, each being located so as to be sandwiched between every two adjacent windings of the plurality of windings; and a tank to contain the core, the plurality of windings and the plurality of insulating plates, the tank being filled with insulating oil, the tank being configured such that the insulating oil flows within the tank in a first direction orthogonal to a central axis direction of the plurality of windings, the plurality of insulating plates each including a first plate-like portion and a second plate-like portion adjacent to each other in the central axis direction, the first plate-like portion being provided with a plurality of first holes extending therethrough in the central axis direction, the second plate-like portion being provided with a plurality of second holes extending therethrough in the central axis direction, at least one of the first plate-like portion and the second plate-like portion being provided with a first notch at one edge in the first direction, and being provided with a second notch at the other edge in the first direction, and the plurality of first holes, the plurality of second holes, the first notch and the second notch overlapping one another, to thereby form a flow path which connects one side and the other side of each of the plurality of insulating plates and through which the insulating oil can flow in the first direction, wherein the plurality of insulating plates each further include a third plate-like portion located on an opposite side to the first plate-like portion in the central axis direction and adjacent to the second plate-like portion, and the third plate-like portion is identical in shape to the first plate-like portion, and is located symmetrically to the first plate-like portion with respect to the second plate-like portion.

* * * * *